United States Patent [19]

Hayasaka

[11] Patent Number: 5,301,922
[45] Date of Patent: Apr. 12, 1994

[54] CHANGE-OVER VALVE MEANS FOR A HYDRAULIC CLUTCH OF THE MARINE PROPULSION UNIT

[75] Inventor: Kenichi Hayasaka, Hamamatsu, Japan

[73] Assignee: Yamaha Hatsudoki Kabushiki Kaisha, Iwata, Japan

[21] Appl. No.: 771,749

[22] Filed: Oct. 4, 1991

[30] Foreign Application Priority Data

Oct. 5, 1990 [JP] Japan .................. 2-266373
Oct. 5, 1990 [JP] Japan .................. 2-266374

[51] Int. Cl.⁵ ............................. F16K 39/06
[52] U.S. Cl. ................... 251/283; 137/625.23; 137/625.24
[58] Field of Search ............ 251/283, 281; 137/625.24, 625.23

[56] References Cited

U.S. PATENT DOCUMENTS 1,657,841  1/1931  Peris .................... 251/283
2,229,933  1/1941  Parker .................. 251/283 X

FOREIGN PATENT DOCUMENTS 654135  11/1937  Fed. Rep. of Germany ...... 251/283

Primary Examiner—John Rivell
Attorney, Agent, or Firm—Knobbe, Martens, Olson & Bear

[57] ABSTRACT

A marine outboard drive having an outboard drive unit that includes a bevel gear forward, reverse transmission having hydraulically operated clutches. A hydraulic pump for actuating the clutches and for lubricating the transmission is driven off the rear end of the input shaft and control valve means selectively communicates the fluid from the hydraulic pump with the hydraulic clutches. The valve means is a rotary plug type valve but is constructed so as to minimize axial and radial forces acting that would tend to bind its movement. The construction of the outboard drive unit is such that the bevel gear transmission and hydraulically operated clutches can conveniently be inserted through like diameter oppositely facing openings formed in the upper end of the housing assembly of the outboard drive unit.

6 Claims, 5 Drawing Sheets 5,301,922

CHANGE-OVER VALVE MEANS FOR A HYDRAULIC CLUTCH OF THE MARINE PROPULSION UNIT

BACKGROUND OF THE INVENTION

This invention relates to a change-over valve means for a hydraulic clutch of a marine propulsion unit and more particularly to an improved rotary plug type valve.

Hydraulic valves are employed for a wide variety of purposes and a rotary plug type valve is a type of valve that is used quite frequently. One example in which such a valve is employed, is in the clutch actuating system for a marine outboard drive. Such a system includes a bevel gear transmission that incorporates clutches for selectively clutching one or another of counter rotating bevel gears for rotation with a shaft to drive the shaft in selected forward or reverse directions.

Conventionally, some form of fluid pump is provided for selectively pressurizing the fluid and a control valve distributes the pressurized fluid to a selected one of the clutches for its actuation while, at the same time, dumping the pressure in the other clutch. A rotary type plug valve, as will be latter described, is normally employed for this purpose. However, rotary type plug valves have certain disadvantages.

In the first instance, a rotary plug valve normally has a large diameter cylindrical body that is supported for rotation in a valve housing for controlling the distribution of fluid under pressure. Normally the fluid is admitted to the plug valve through an axially extending bore that opens through one end of the valve and which is intersected by a radially disposed delivery port. The fluid pressure admitted to the valve always acts against the end of the valve and hence exerts an axial force acting against an end housing. Although thrust bearings are normally employed so as to facilitate rotation of the valve, the large fluid pressure acting on the valve due to the large area across which the pressure reacts can give rise to difficulties in operating the valve.

In addition to these difficulties, the radially extending delivery port also gives rise to a radial reactive force on the valve element which tends to cause it to bind against the cylindrical wall of the housing and further makes rotation of the valve difficult.

It is, therefore, a principal object to this invention to provide an improved rotary plug type valve.

It is a further object to this invention to provide a rotary plug type valve in which the axial forces acting on the valve are substantially minimized.

It is a further object to this invention to provide a rotary plug type valve in which radial forces on the valve are eliminated or balanced.

SUMMARY OF THE INVENTION

A first feature of this invention is adapted to be embodied in a rotary plug type valve having a cylindrical body portion that is rotatable supported within a cylindrical bore of a valve housing. The valve body has a reduced diameter end portion that is received in a small diameter bore of the valve housing. Fluid under pressure is admitted to an axially extending passage that extends through the smaller diameter end portion and which terminates in the larger diameter body portion and is intersected by a radial delivery port for minimizing the axial forces on the valve.

Another feature of the invention is also adapted to be embodied in a rotary plug type valve for a fluid system having a cylindrical valve member that is rotatable supported within a cylindrical bore of a valve housing. Fluid is admitted to the valve for discharge through a radially extending delivery port that is adapted to selectively communicate with a supply port formed in the valve housing. In accordance with this feature of the invention, a reactive port is formed in the valve member that extends at 180° to the delivery port and which will create a reactive force against the valve housing that balances the forces in radial directions on the valve element.

BRIEF DESCRIPTION OF THE DRAWINGS

FIG. 6 shows the forward drive position, FIG. 7 shows the neutral condition and FIG. 8 shows the reverse drive condition.

DETAILED DESCRIPTION OF THE PREFERRED EMBODIMENTS OF THE INVENTION

Figure 1:
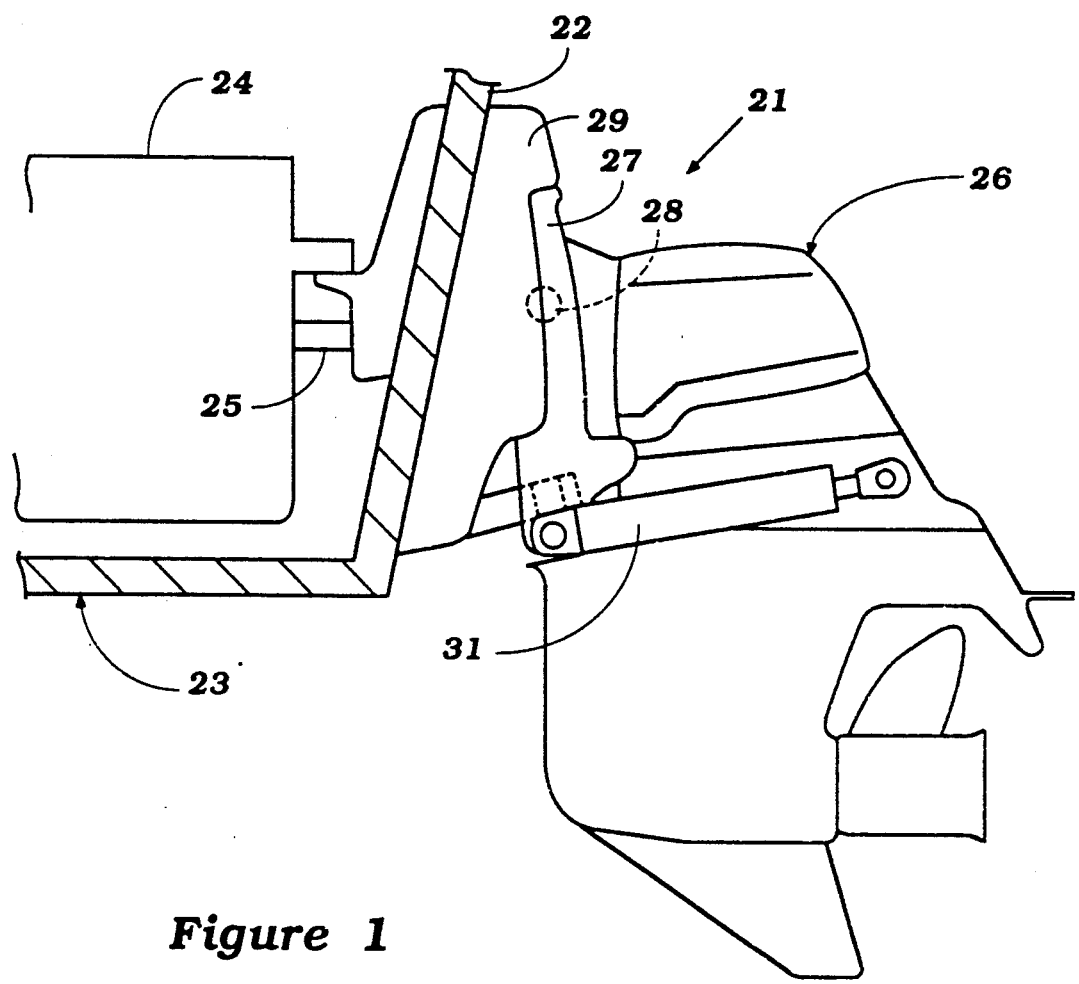
FIG. 1 is a side elevational view of a portion of an inboard/outboard drive as attached to the transom of a watercraft, shown partially and in cross section.

Referring first in detail to FIG. 1, an inboard/outboard marine propulsion unit constructed in accordance with an embodiment of the invention is identified generally by the reference numeral 21. The inboard/outboard drive 21 is adapted to be mounted on the transom 22 of a watercraft, the hull of which is shown in partial cross section and which is identified generally by the reference numeral 23.

The inboard/outboard drive 21 includes an inboard mounted internal combustion engine 24, which may of any known type and which is mounted forwardly of the transom 22 in a suitable manner. The engine 24 has its output shaft 25 extending through the transom 22 for driving an outboard drive unit mounted in an outer housing assembly 26.

The outer housing assembly 26 is mounted on a gimble ring 27 for tilt and trim movement about a horizontally extending axis by means of tilt pins 28 in a well known manner. The gimble ring 27 is, in turn, mounted in a stern plate 29 for steering movement about a generally vertically extending steering axis. A hydraulic cylinder assembly 31 is interposed between the gimble ring 27 and outboard drive unit outer housing 26 for accommodating power tilt and trim movement.

Figure 2:
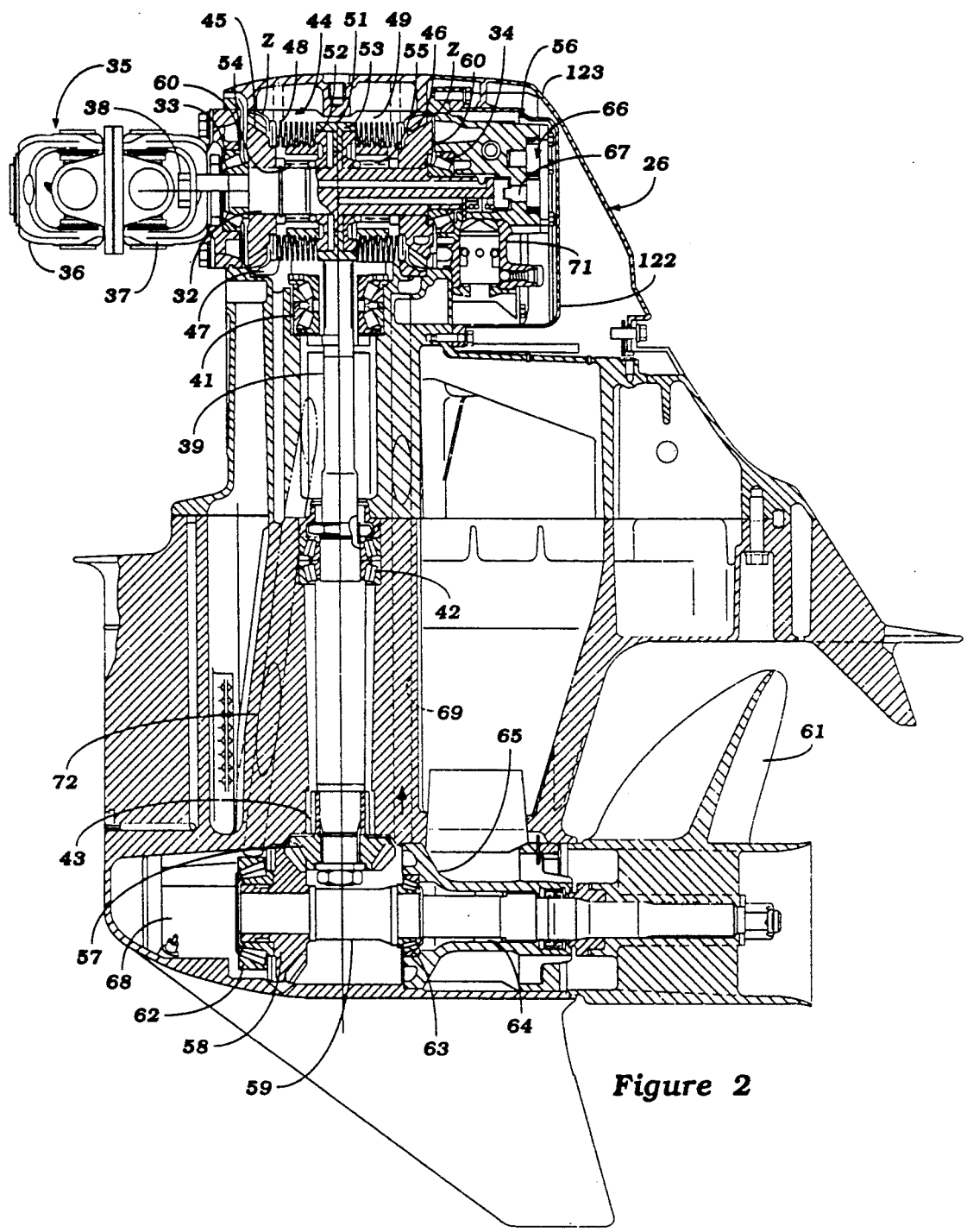
FIG. 2 is an enlarged cross sectional view taken along a vertically extending axis of the outboard drive.

Referring now in detail to FIG. 2, the outboard drive unit outer housing 26 is made up of a number of interconnected pieces and includes an upper portion in which an input shaft 32 is journalled by means of a front bearing 33 and a rear bearing 34 that are affixed in the housing assembly in a suitable manner. A universal joint assembly, indicated generally by the reference numeral 35 has a front yoke 36 which is affixed to the rear end of the engine output shaft 25, as by a splined connection and a rear yoke 37 which is affixed to the forward end of the input shaft 32 by means of a splined connection and a threaded fasteners 38.

A generally vertically extending drive shaft 39 is journalled within the outer housing 26, at its upper portion by a thrust bearing 41, at its intermediate portion by a thrust bearing 42 and at its lower portion by a neddle bearing 43. The axis of rotation of the drive shaft 39 generally intersects the horizontally extending rotational axis of the input shaft 32.

A forward, neutral and reverse transmission, indicated generally by the reference numeral 44 is contained within the upper portion of the housing assembly 26 for selectively driving the drive shaft 39 from the input shaft 32 in selected forward and reverse directions. This transmission includes a pair of driving bevel gears 45 and 46 that are journalled for rotation on the input shaft 32 on opposite sides of and enmeshed with a driven bevel gear 47 that is affixed for rotation to the upper end of the drive shaft 39 in a known manner.

Forward and reverse multiple discs clutches 48 and 49 are provided for selectively coupling a clutch housing 51 that is affixed, as by welding, to the input shaft 32 to the gears 45 and 46 respectively, so as to drive the drive shaft 39 in forward and reverse directions, as aforenoted. The clutches 48 and 49 have a first series of plates that are externally splined and have a splined connection with the clutch housing 51 so as to rotate with it. These driving clutch plates are interspersed with driven clutch plates that have an internal splined connection to hubs of the gears 45 and 46.

The clutch housing 51 defines a pair of oppositely facing bores in which forward and reverse clutch actuating pistons 52 and 53 are slideably supported. The pistons 52 and 53 are normally urged to a retracted position by means of respective release springs 54 and 55 that act between circle clips fixed to the input shaft 32 and the pistons 53 and 53, respectively.

As is well known, the operation of the bevel gear transmission comprised of the driving bevel gears 45 and 46 and the driven bevel gear 47 will create axial thrust on the driving bevel gears 45 and 46 that tend to urge these gears apart. If the clutch springs 54 and 55 acted against the driving bevel gears 45 and 46, as with prior art type of constructions, then these driving thrusts would adversely effect the release pressure of the springs 54 and 55. By having the springs 54 and 55 act against the circle clips affixed to the input shaft 32 rather than act directly against the driving bevel gears 45 and 45 these disadvantages are avoided.

In addition to this feature, the rear ends of the driving bevel gears 45 and 46 are engaged with thrust bearings 60 which act against the inter races of the thrust bearings 33 and 34 so as to take these axial thrusts on the driving bevel gears 45 and 46. Corresponding thrust bearings are interposed between the opposite faces of the driving bevel gears 45 and 46 and the circle clips that the release springs 54 and 55 act against. The pistons 52 and 53 are selectively pressurized, by means of a control assembly, indicated generally by the reference numeral 56 and which is mounted in the rear of the upper portion of the outer housing assembly 26 in a manner to be described.

The lower end of the drive shaft 39 has affixed to it a bevel gear 57 which is enmeshed with a bevel gear 58 fixed to a propulsion device, in the form of a propeller shaft 59 and propeller 61 that is affixed for rotation with the propeller shaft 59 in an appropriate manner. The propeller shaft 59 is journalled in the lower portion of the outer housing assembly 26 by a forward thrust bearing 62, a reverse thrust bearing 63 and a needle bearing 64. The bearings 63 and 64 are mounted within a bearing carrier 65 that is affixed to the lower end of the outer housing assembly 26 in a known manner.

The control assembly 56 includes a pressure pump 66 that is made up of a pair of intermeshing gears, one of which has a keyed connection 67 to the rear end of the input shaft 32 to be driven thereby. This gear pump 66 draws lubricant from a reservoir 68 formed in the lower portion of the housing assembly 26 around the gears 57 and 58 through a delivery passageway 69. The pressurized fluid is then delivered to a control valve assembly, indicated generally by the reference numeral 71 and which has a construction, as will be described. The pressurized lubricant is then delivered to various components of the system including the bevel gears 45 and 46, the bearings 41 and 42 and back to the reservoir 68 through a return passageway 72 for eventual recirculation. In addition, the control valve 71 can selectively pressurize either the piston 52 or the piston 53 for energizing or engaging either the clutch 48 or 49.

Figure 3:
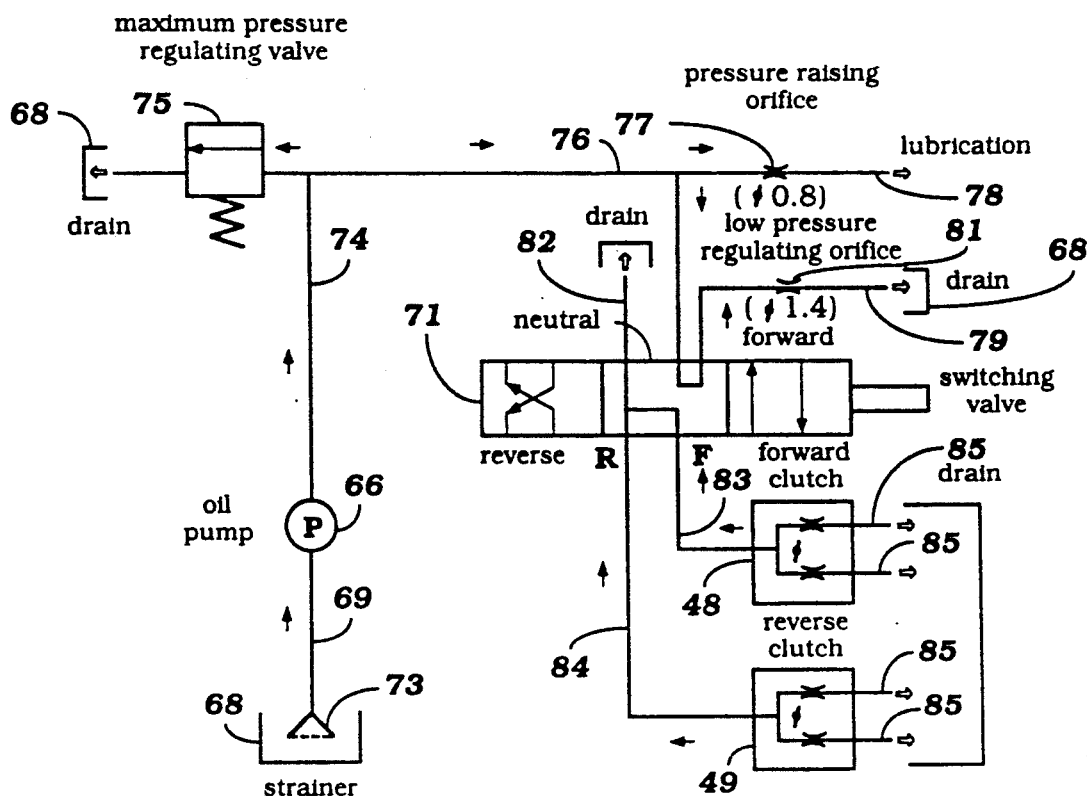
FIG. 3 is a schematic view of the hydraulic system for actuating the clutches of the transmission and lubricating the transmission and is shown in the neutral transmission condition.
Figure 4:
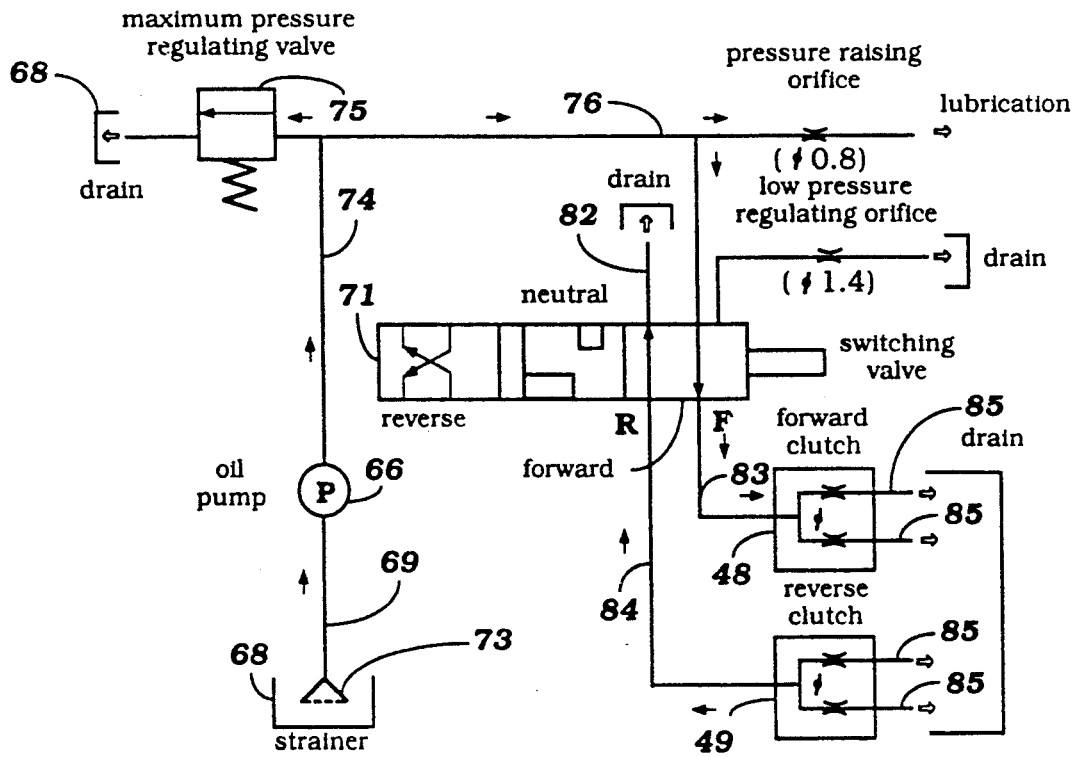
FIG. 4 is a schematic view, in part similar to FIG. 3, showing the condition in the forward drive mode.

This system is shown best in FIGS. 3 and 4. As may be seen, a strainer or filter 73 may be provided at the inlet end of the passage 69 for filtering the lubricant and the lubricant is then delivered to a discharge conduit 74 in which a pressure regulating valve 75 is positioned. The regulating valve 75 limits the maximum hydraulic pressure in the system by dumping the excess fluid back to the lubricant cavity 68 through a suitable drain passageway.

In addition, the line 74 communicates with a line 76 in which a pressure reducing orifice 77 is positioned so as to regulate the pressure in the lubrication system by appropriately sizing the orifice 77. The orifice 77 then outputs its fluid to a line, shown schematicly at 78, which delivers lubricant to the various components as aforenoted. These lubricant lines will be later on described. It should be noted that in the neutral position of the shift control valve 71, the pressure line 76 is communicated with a further drain line 79 in which an orifice 81 is provided so as to further control the pressure when no lubricant is being delivered to the clutches for their actuation.

The valve 71 selectively communicates either the pressure line 76 or a drain line 82 with either of conduits 83 and 84 which extend to the actuating pistons 52 and 53 of the forward and reverse clutches, respectively. The lines 83 and 84 may be conveniently formed by drilling through the interior of the input shaft 32 and intersecting the drilled passages with radial passages.

The back side of the clutch pistons 52 and 53 are also provided with restricted drain lines 85 that extend back to the reservoir 68 through suitable internal passages so as to relieve the pressure on the back side of the pistons 52 and 53 when they are actuated.

FIG. 4 shows the position when the transmission is shifted into forward condition by moving of the valve 71 so as to expose the forward clutch line 83 to the pressure line 76 and the reverse clutch line 84 to the drain line 82. When this occurs, the forward clutch 48 will be engaged and the reverse clutch 49 will be released and the propeller shaft 59 and propeller 61 will be driven in a forward drive position.

As should be readily apparent, when the transmission is shifted into reverse, the reverse clutch line 84 is communicated with the pressure line 76 and the forward clutch line 83 is communicated with the drain line 82.

As may be seen in FIG. 3, when the transmission is shifted into neutral by moving of the selector valve 71 to this position, both forward and reverse clutch lines 83 and 84 are connected to the drain line 82.

In addition to pressurizing the clutch pistons 52 and 53, as already noted, the pump 66 also delivers lubricant to the various components of the transmission. Specifically, the input shaft 32 may be drilled with further passages to supply lubricant to the forward drive gear 45 and the reverse drive gear 46 which will lubricant not only these gears by also the driven bevel gear 47.

The outer housing assembly 26 of the outboard drive portion 12 as has been noted is made up of a number of pieces. One of these main pieces is formed with a pair of oppositely facing bored openings having a dimension Z which is sized adequately so as to permit insertion of the transmission assembly 45 through the opposite sides along with the input shaft 32. For example, the input shaft 32 may be inserted through the forward end of the housing through the forward most opening Z and then the multiple discs clutches 48 and driving bevel gear 45, which have a smaller diameter than the opening Z, can be insert therethrough. The clutches of the clutch assembly 49 and the driving bevel gear 46 are inserted through the rear face. The front face is then closed by a closure plug that carries the bearing 33 and the rear face is closed by the control assembly 56 which carries the thrust bearing 54. As a result, the construction can be very easily assembled.

Also, unlike prior art type of constructions, the diameters of the driving bevel gears 45 and 46 is less than the diameter of the driven bevel gear 47. This permits a lower overall height but along elongates the area between the driving bevel gears 45 and 46 and permits the use of a greater number clutch plates for the clutches 48 and 49 and, accordingly, higher torque transmitting capabilities without increasing the overall size of the assembly.

In FIGS. 3 and 4, the transmission selector valve 71 has been depicted as a reciprocated spool type valve. However, in actual practice this valve is a rotary plug type valve. However, the valve has certain improvements over the prior art type of constructions which prior art constructions are shown in FIGS. 5 through 8 and the defects of the prior art constructions will be now described by particular reference to these figures.

In describing the prior art valve, the supply and drain passages already described have been identified by the same reference numerals, however the valve is indicated generally by the reference numeral 151. The valve 151 is formed in the housing assembly 26 and specifically includes an enlarged diameter cylindrical bore 152 formed therein in which a rotating plug type valve member, indicated generally by the reference numeral 153 is rotatably journalled. The plug member 153 has a reduced stem portion 154 that extends through the lower portion of the housing 26 and which has an actuating lever 155 affixed to it for rotating the valve member 153. The upper end of the bore 152 is intersected by the supply port 76 so that hydraulic pressure will be introduced to the upper end of the bore 152 against the end face of the valve member 153.

An axially extending port 156 is formed in the valve member 153 and communicates with the upper end of this bore and terminates at its lower end with a radially extending passage 157. As may be seen in FIGS. 6, 7 and 8, rotation of the valve member 153 will selectively communicate the passage 157 with the forward clutch line 83 (FIG. 6), with neither clutch line in the neutral position (FIG. 7) or with the reverse clutch line 84 (FIG. 8).

Diametrically opposite sides of the valve member 153 are provided with flattened reliefs 158 and a cross passage 159, which may be formed from a steel tube inserted into a drilled bore in the valve member 153 communicates these reliefs 158 with each other.

Figure 6:
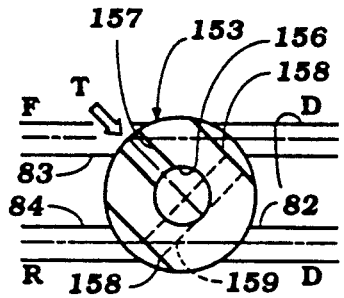
FIGS. 6, 7 and 8 are cross sectional views taken along the line 6—6 and show how the prior art construction has a side thrust that makes shifting difficult.

As shown in FIG. 6, when in the forward position, the relief 158 opens to the reverse clutch passage 84 and returns the hydraulic fluid from the back side of the reverse clutch to the drain through the return 82. In the neutral position, both the forward and reverse clutch lines 83 and 84 are communicated with the drains 82 through the reliefs 158 and the drain lines also communicate with each other. In the reverse condition (FIG. 8), the supply line 157 communicates with the reverse clutch line 84 while the forward clutch line 83 communicates with the drain 82 through the relief 158 and cross passage 159.

A detent ball 161 is provided in the housing 26 and is urged by a coil compression spring 162 into selected one of forward, neutral or reverse detent openings 83 for holding the valve member 153 in either the forward, neutral or reverse positions.

As noted, there are two problems with the prior art type of valve shown in FIGS. 5 through 8. First, because the high pressure inlet is exposed against the end face of the valve member 153 which has a large diameter, a downward force indicated by the arrow D will be exerted on the valve member 153 which urges it against a lower thrust bearing 164 that is provided in the housing 26 to facilitate rotation of the valve member 153. This high downward force will, however, cause a binding action that makes rotation of the valve 153 difficult even though the thrust bearing 164 is provided.

Figure 7:
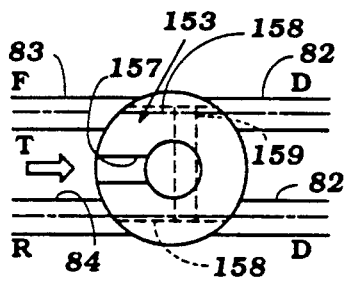
Figure 5:
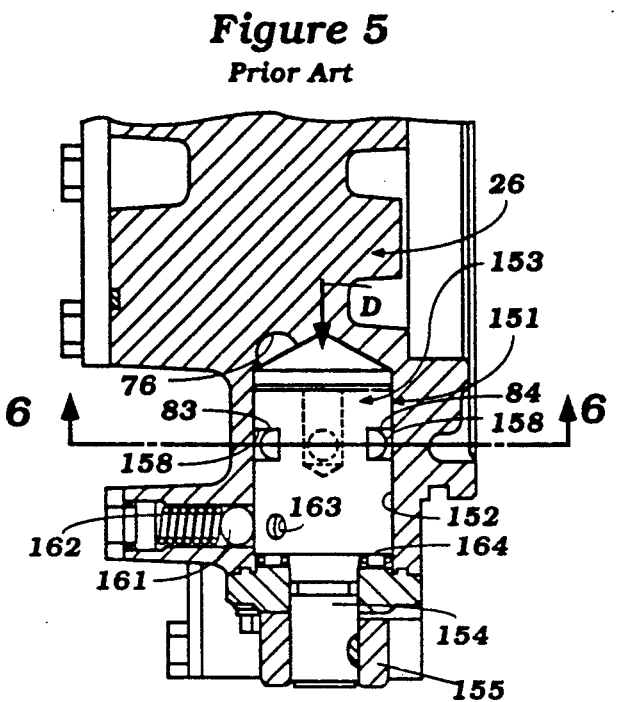
FIG. 5 is a vertically, cross sectional view taken through a control valve of a prior art type of construction.
Figure 8:
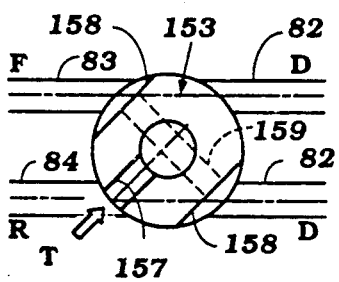

In addition to this downward force D, there is also provided a reactive force T that acts in a generally radial direction as indicated by the arrows in FIGS. 6 through 8 regardless of the angular position of the valve member 153. That is, the pressure in the supply conduit 157 acting against either the housing or the forward or reverse ports 83 or 84 gives a side thrust to the valve member 153 in prior art constructions which also makes rotation of the valve member difficult. These problems are avoided with the valve members, which will now be described by particular reference to the embodiments of FIGS. 9 through 13 and FIGS. 14 and 15.

Referring first to the embodiments of FIGS. 9 through 13, the housing 26 is provided with a bore 86 in which a complimentary cylindrical portion 87 of a valve member, indicated generally by the reference numeral 88 is positioned. The bore 86 terminates at a smaller diameter bore 89 in which a smaller diameter cylindrical portion 91 of the valve member 88 is rotatably positioned. The supply conduit 76 communicates with the small diameter bore 89 and, therefore, the fluid pressure will act on only the small diameter valve portion 91 and thus reduce the axial force acting upon the valve member 88 and thus reducing its resistance to rotation and the load on a lower thrust bearing 92.

As with the prior art type of constructions, the valve member 88 also has a stem portion 93 to which an actuating lever 94 is affixed in an appropriate manner for rotating the valve member 88.

Figure 13:
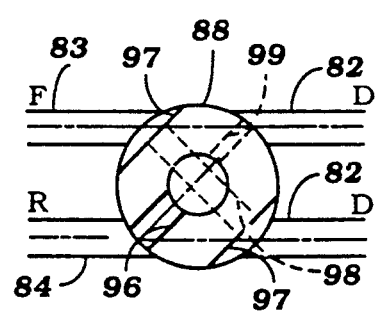

A centrally bored supply passage 95 extends through the smaller diameter portion 91 and larger diameter portions 87 of the valve member 88 and terminates in a radially extending supply passage 96 which is adapted to selectively communicate with either the forward clutch supply port 83 (FIG. 11) or the reverse clutch supply port 84 (FIG. 13).

Figure 12:
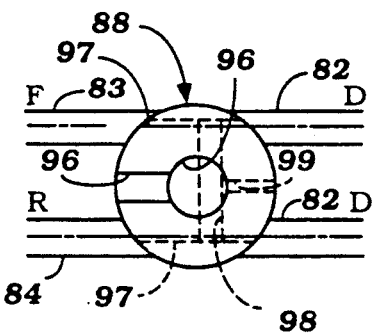

In the neutral position, FIG. 12, the supply passage 96 does not communicate with either of the clutch ports 83 and 84. In the neutral position, reliefs 97 formed on opposite sides of the valve portion 87 communicate the clutch ports 83 and 84 with the drain ports 82, as with the prior art type of constructions.

As also with the prior art constructions, a cross passage 98 formed by a steel tube inserted in a drilled passageway communicates the reverse clutch port 84 with the drain 82 in the forward drive position (FIG. 11) and the forward clutch port 83 with the drain port 82 in the reverse drive position (FIG. 13).

In addition to the supply port 96, the central valve member portion 87 is provided with a pair of smaller diameter cross drilled, axially spaced reactive ports 99 which extend at 180° from the supply port 96. The ports 99 are disposed so that they will not register with the either the clutch ports 83 and 84 or the drain ports 85 regardless of the position of the valve member 88. As a result, fluid pressure that is applied through the supply port 96 will be balanced by the fluid pressure acting through the reaction ports 99 so as to insure against any unbalanced radial forces acting on the valve member 88 which would resist its rotation. Accordingly, the problems of the prior art type of valves aforenoted are avoided with this construction.

Like the prior art type of construction, there is provided a detent ball 101 that is acted on by a coil spring 102 and cooperates with a plurality of detent recesses 103 for holding the valve member 88 in its forward, neutral and reverse positions.

Figure 14:
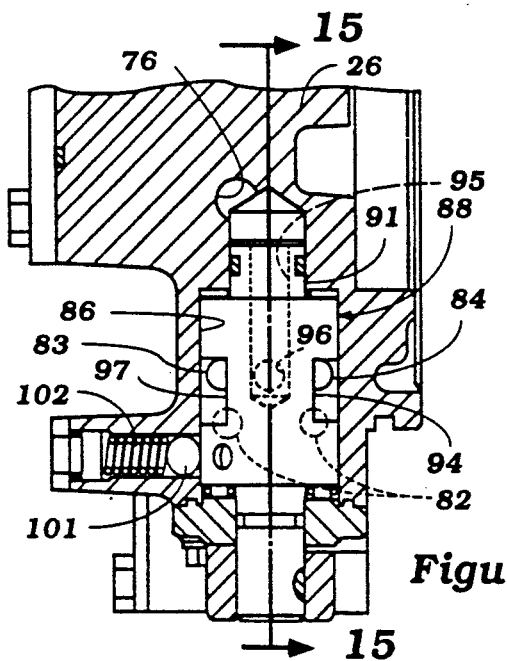
FIG. 14 is a cross sectional view, in part similar to FIG. 9, and shows another embodiment of the invention.
Figure 15:
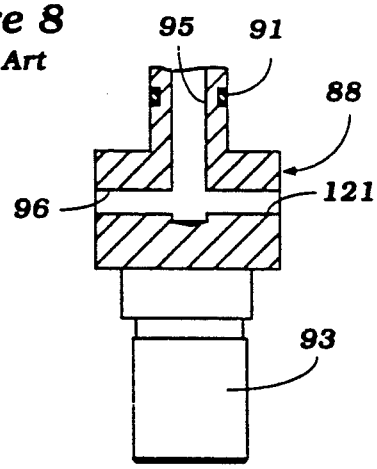
FIG. 15 is a cross sectional view taken along the line 15—15 of FIG. 14.
Figure 9:
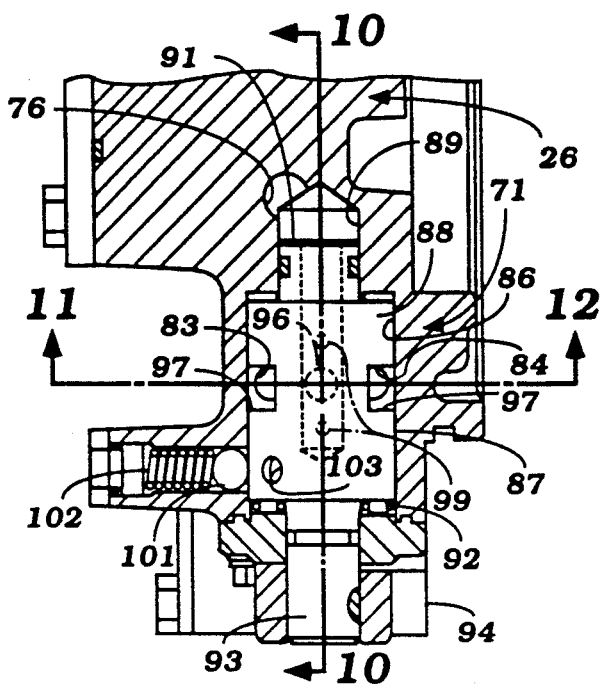
FIG. 9 is a cross sectional view, in part similar to FIG. 5, and shows a valve constructed in accordance with an embodiment of this invention.
Figure 10:
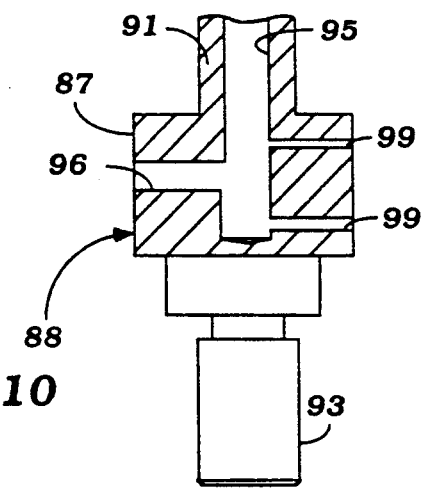
FIG. 10 is a cross sectional view taken along the line 10—10 of FIG. 9.
Figure 11:
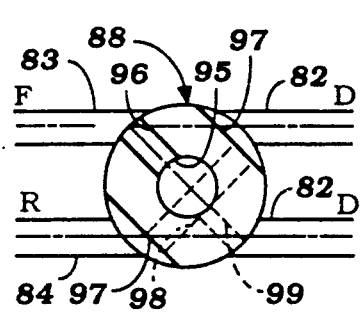
FIGS. 11, 12 and 13 are cross sectional views taken along the line 11—11 of FIG. 9 and show the valve in the forward, neutral and reverse modes.

FIGS. 14 and 15 show another embodiment of the invention which is generally the same as the embodiment of FIGS. 9 through 13 and where the components are the same, those components have been identified by the same reference numerals. This embodiment, like the embodiment of FIGS. 9 though 13 provides the small diameter end portion 91 so as to reduce the axial forces operated on the valve member 88. In this embodiment, however, the side reliefs 97 have a greater axial extent and the clutch ports 83 and 84 are axially spaced from the drain ports 82. This permits the supply passage 96 to be formed co-extensively with a reaction passage 121 which will then be able to act against the bore surface 86 in all positions of the valve member 88 to provide the reactive force without the loss of fluid pressure through the drains 82. In all other regards, this embodiment is the same as the embodiment of FIGS. 9 though 13 and, as noted, has all the advantages of that embodiment.

Returning again to FIG. 2, a clutch actuator housing 122 is affixed over the hydraulic pump 66 and selector valve 71 and encloses the hydraulic mechanism as afore described. It should also be readily apparent that the forward drive gear 45 and forward clutches 44 may be removed through an opening in the forward portion of the housing assembly 26 for servicing. In a like manner, the hydraulic control assembly 56, reverse drive gear 46 and reverse clutch 49 may be removed and serviced by removing a removable cover plate 123 of the housing assembly 26.

It should be readily apparent that the described rotary valve construction employed minimizes both axial and radial forces acting on the valve that tend to resist its rotation. Although the described embodiments have constructions for minimizing both axial and radial forces, it should be apparent that either feature can be used independently of the other. Of course, there are advantages in combining these features, as should be obvious to those skilled in the art. Also, although several embodiments of the invention are illustrated and described, various other changes and modifications may be made without departing from the spirit and scope of the invention, as defined by the appended claims.

I claim:

1. A rotary type plug valve for a hydraulic system comprising a valve housing defining a cylindrical bore, a valve element having a cylindrical portion journalled within said bore by means including thrust bearing means for taking axial thrust on said valve element, said valve element having an end portion thereof with a reduced diameter cylindrical portion received in a complimentary reduced diameter cylindrical bore of said valve housing, means for admitting fluid under pressure to said smaller diameter housing bore portion and to an axially extending passage formed in said reduced diameter portion of said valve element and terminating in the large diameter cylindrical portion thereof, and a delivery port extending radially through said larger diameter portion and intersecting said axially extending passage.

2. A rotaty type plug valve as set forth in claim 1 furhter including a reactive port extending radially through the larger diameter portion and disposed at 180° to the delivery port for balancing hydraulic forces acting between the valve element and the valve housing.

3. A rotary type plug valve as set forth in claim 2 wherein there are a pair of reactive ports each intersecting the axially extending passage and being axially spaced from each other on opposite sides of the delivery port.

4. A rotary type plug valve as set forth in claim 3 further including a pair of grooves formed on the cylindrical portion and a cross passage extending therebetween and adapted to communicate with drain ports.

5. A rotary type plug valve as set forth in claim 4 wherein the drain ports are axially spaced from the delivery port.

6. A rotary type plug valve as set forth in claim 1 wherein the thrust bearing means is disposed at the opposite end of the valve element from the reduced diameter end portion thereof.

* * * * *